United States Patent

Enomoto

[15] 3,694,812

[45] Sept. 26, 1972

[54] SWITCHING CIRCUIT HAVING A CONTROLLABLE SEMICONDUCTOR SWITCHING ELEMENT AND A SWITCHING MATRIX EMPLOYING THE SWITCHING CIRCUIT

[72] Inventor: Osamu Enomoto, Tokyo, Japan

[73] Assignee: Nippon Electric Company, Limited, Tokyo, Japan

[22] Filed: Aug. 20, 1971

[21] Appl. No.: 173,600

[52] U.S. Cl. ..........................340/166 R, 179/18 GF

[51] Int. Cl. .............................................H04q 3/50

[58] Field of Search.340/166 R; 179/18 GF; 307/284

[56] References Cited

UNITED STATES PATENTS 3,542,963 11/1970 Aagaard................179/18 GF

*Primary Examiner*—Donald J. Yusko

*Attorney*—Nichol M. Sandoe et al.

[57] ABSTRACT

A circuit for switching analog signals between an input and output and having a high S/N ratio includes a controllable semiconductor switching device coupled between the input and output terminals and having a control electrode. The latter is coupled to a bypass circuit which grounds the control electrode at the analog signal frequency. The bypass circuit acts as a constant-current source when the voltage at the control electrode exceeds a predetermined value, the magnitude of the constant current being less than the current flowing through the switching element when the latter is conductive.

13 Claims, 4 Drawing Figures

Figure 1:
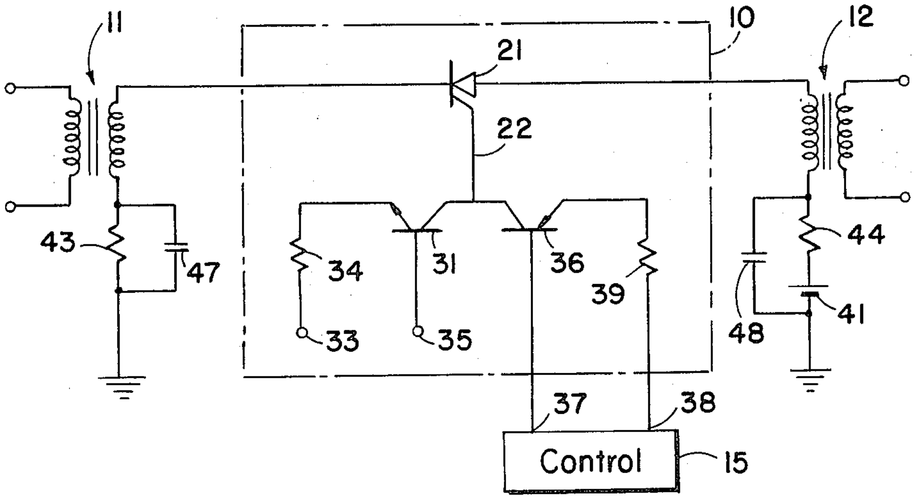

INVENTOR
Osamu Enomoto
by
Sandoe, Hopgood & Calimafde
ATTORNEYS

INVENTOR
Osamu Enomoto
by
Sandoe, Hopgood & Calimafde
ATTORNEYS

SWITCHING CIRCUIT HAVING A CONTROLLABLE SEMICONDUCTOR SWITCHING ELEMENT AND A SWITCHING MATRIX EMPLOYING THE SWITCHING CIRCUIT

This invention relates generally to switching circuits and more particularly to a circuit for switching signals which includes a controllable semiconductor switching element. The invention further relates to a switching matrix having crossing conductors for analog signals, and a plurality of switching circuits at the respective crossovers. The switching matrix is useful in a telephone or a data switching system.

In a conventional switching circuit for analog signals, such as one employing a silicon controlled rectifier as the switching element, leakage of the signal caused mainly by the leakage current between the anode and the cathode of the rectifier adversely contributes to the S/N ratio of the switching circuit. In a conventional switching matrix comprising switching circuits of this type, the signal leakage results in substantial cross-talk. An attempt to remove the signal leakage has been made by Allen Croiseuille, as described in a Japanese Pat. Publication No. 44-25134 issued Oct. 23, 1969. The switching matrix disclosed by Croiseuille includes a first and a second parallel conductor in each of the rows and the columns for establishing connection between the conductors of the selected row and column, wherein non-conductive semiconductor devices are connected so as to form balanced capacitive bridges together with the active semiconductor devices for connecting the corresponding conductors at the respective crossovers. Each of the nonconductive semiconductor devices has substantially the same capacitive characteristics as the active semiconductor devices. The Croiseuille switching matrix, however, is not applicable to an unbalanced switching matrix and moreover requires two active and two non-conductive semiconductor devices at each crossover.

It is an object of this invention to provide a switching circuit for analog signals having a controllable semiconductor switching element, wherein signal leakage is substantially prevented.

It is another object of this invention to provide a switching circuit of the type described having an excellent S/N ratio.

It is still another object of this invention to provide a switching circuit of the type described which has substantially no signal leakage and yet which may be of the unbalanced type.

It is a further object of this invention to provide a switching matrix employing a plurality of switching circuits having substantially no signal leakage and an excellent S/N ratio.

It is a still further object of this invention to provide a switching matrix of the type described wherein the signal leakage is substantially obviated with little power consumption.

The switching circuit of the invention includes a controllable semiconductor switching element having a control electrode which, upon the application thereto of a control signal, actuates the switching element to render that element conductive and thereby cause an input signal to be conducted through the switching element between an input and an output terminal. A bypass circuit is coupled to the switching element for grounding the control electrode of that element with respect to the frequency of the controlled analog signal. The bypass circuit also serves as a constant-current circuit when the electric potential at the control electrode is higher than a predetermined value, the magnitude of the constant current being below the current which flows through the switching element when it is conductive.

According to one aspect of this invention, the switching circuit further comprises an actuating circuit having two input terminals for receiving two input electric signals, respectively, and an output terminal for supplying an output control signal to the control electrode of the switching element. The control signal assumes the value for rendering the switching element conductive when the two input electric signals assume respective predetermined values.

According to another aspect of this invention, switching circuits of the invention are employed in a switching matrix having a controllable semiconductor switching element at each of the crossovers of the row and the column conductors for establishing and breaking the connection for analog signals between the row conductor and the column conductor crossing at each of the crossovers.

The constant-current characteristics of the bypass circuit may preferably be provided by the collector resistance which a transistor exhibits above a predetermined value of the collector voltage. This characteristic may also be provided by the resistance which a metal oxide field effect transistor exhibits between the source and the drain above a predetermined value of the source voltage. When the controllable semiconductor element is nonconductive, the leakage current flowing between its anode and cathode is bypassed by the bypass circuit to reduce the signal leakage. When the controllable semiconductor element is conductive, that portion of the current flowing between the anode and the cathode is bypassed by the bypass circuit, which is equal to the constant current. Inasmuch as the bypassed current is constant, the bypass circuit does not introduce a loss to the signal current superposed on the current flowing between the anode and the cathode. Inasmuch as the constant current is precisely determined by design, it is possible to compensate for the bypassed current if the direct-current component of the current flowing between the anode and the cathode is meaningful.

The use of a combination of two input signals to cause the actuating circuit to actuate the controllable semiconductor switching element is convenient for the application of these switching circuits to a switching matrix where a row and a column conductor is selected to establish the desired connection therebetween.

In a switching matrix according to the invention, a small electric current flows through each of the bypass circuits even when the controllable semiconductor elements are in the nonconductive state, resulting in the consumption of power. This adverse feature is most significant when the switching circuits are used in a telephone switching system, particularly on the side of the subscribers where the switches are seldom turned on. However, by the use of a further aspect of this invention, the actuating transistors connected to the controllable semiconductor switching elements aligned with those conductors of a set along which the bases are connected together and to which none of the conductors of the other set are connected through the elements, serve to bypass the signal leakage to reduce the crosstalk, while the bypass circuit connected to only the remaining semiconductor switching elements serve to bypass the current flowing through such elements, thereby reducing the overall power consumption.

Figure 2:
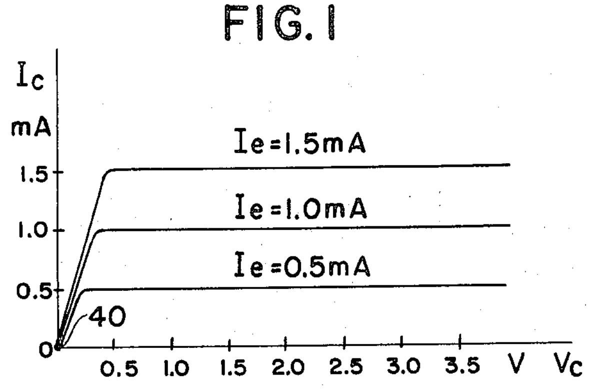
Figure 4:
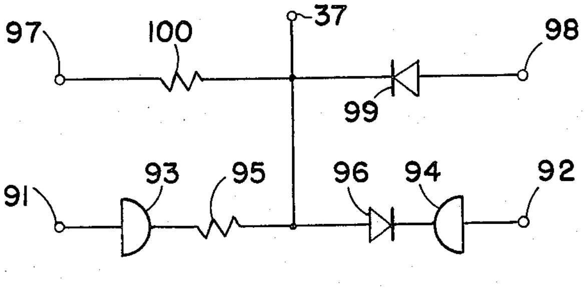
Figure 3:
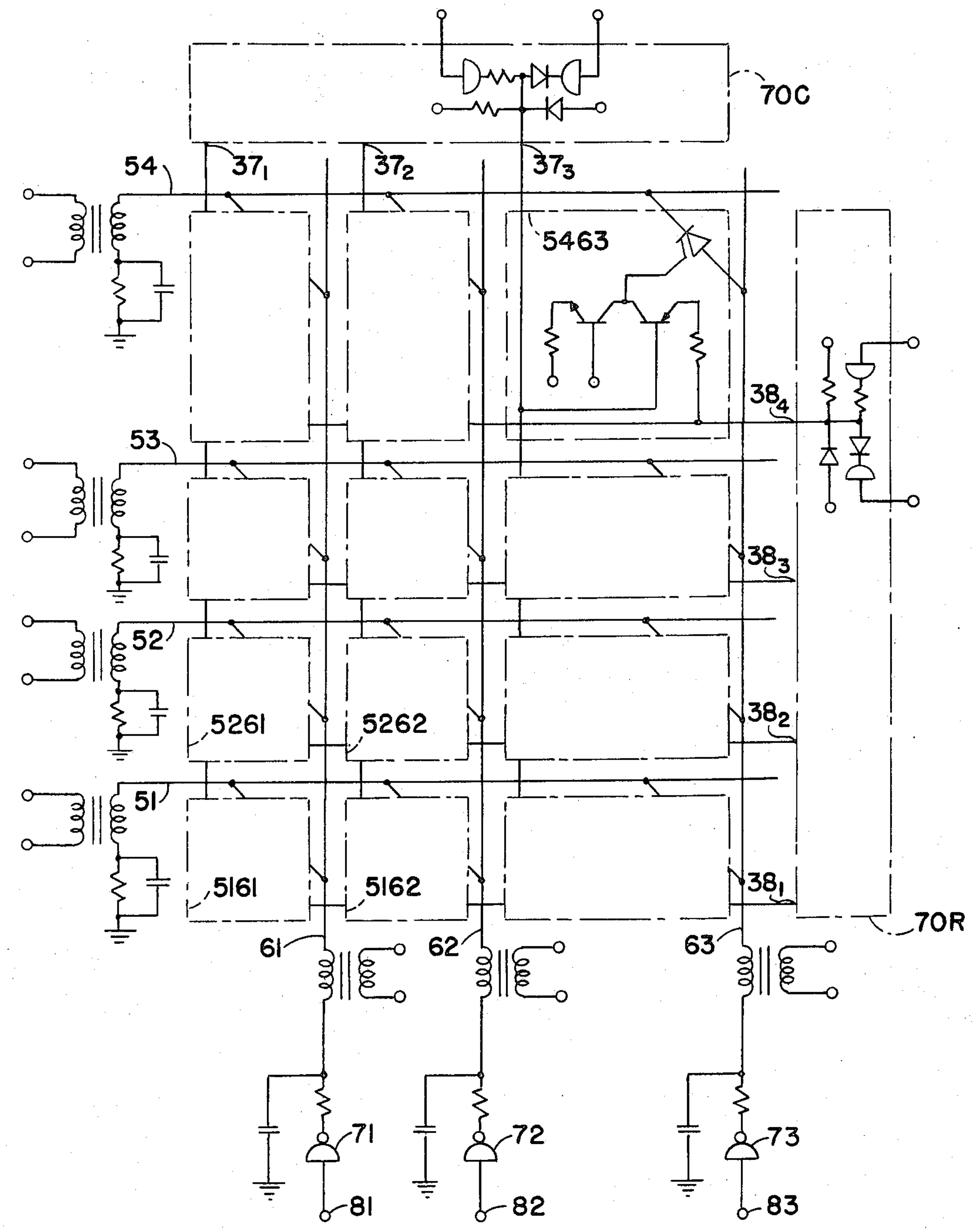

To the accomplishment of the above and to such further objects as may hereinafter appear, the present invention relates to a switching circuit and a switching matrix substantially as defined in the appended claims and as described in the following specification taken together with the accompanying drawings in which:

FIG. 1 is a schematic circuit diagram of a switching circuit according to one embodiment of this invention;

FIG. 2 diagrammatically shows the constant-current characteristics of the collector current of a transistor;

FIG. 3 is a schematic diagram partly in block form of a switching matrix according to another embodiment of this invention; and FIG. 4 is a schematic circuit diagram of a circuit for providing the selected one of three predetermined values to the output signal to be used to control the actuation of the controllable semiconductor switching elements used in the switching circuit and matrix of this invention.

Referring to FIG. 1, a switching circuit generally designated 10 according to this invention, is interposed between a first terminal 11 and a second terminal 12, here shown in the form of input and output transformers, to either connect or disconnect the signal path for an analog signal between terminals 11 and 12, under the control of a control circuit 15 coupled to switching circuit 10. The switching circuit 10 comprises a controllable semiconductor switching element here shown in the form of a silicon controlled rectifier 21 having a control electrode 22 and an anode-cathode circuit. As is known, conduction in the anode-cathode circuit of rectifier 21, interposed between terminals 11 and 12, is controlled by the signal applied to control electrode 22.

According to the invention, a bypass circuit is coupled to the control electrode of the switching electrode. That circuit as herein shown includes a bypass PNP transistor 31 having a collector coupled to control electrode 22, an emitter coupled to a voltage source 33 through a resistor 34, and a base coupled to a power source 35. The switching circuit may, as shown, further include an actuating PNP transistor 36 having a collector connected to that of transistor 31 and to control electrode 22, a base coupled to a first terminal 37 of control circuit 15, and an emitter coupled to a second terminal 38 of control circuit 15 through a resistor 39.

The silicon controlled rectifier, the bypass transistor, and the actuating transistor may be 2SF104, 2SO639, and 2SA605, respectively, manufactured by Nippon Electric Company, Tokyo, Japan. The resistors 34 and 39 may be 3 and 1 kilohms, respectively. The electric potentials of voltage source 33, power source 35, and first and second terminals 37 and 38 of control circuit 15 may be −4V, −1 through 0V, 10 through 11v, and 6 through 7V, respectively.

In the operation of the switching circuit, when it is desired to transmit the analog signal through switching circuit 10, the potentials at terminals 37 and 38 of control circuit 15 are interchanged. The operating point for bypass transistor 31 is selected so as to cause an emitter current to flow that provides the collector circuit with a constant current characteristic.

Referring to FIG. 2, a transistor, such as bypass transistor 31, exhibiting excellent constant current characteristics, in which the differential resistance of the collector circuit is more than several hundred kilohms when the collector voltage $V_C$ determined by the potential of control electrode 22 of the silicon controlled rectifier 21 is higher than about 1V. When silicon controlled rectifier 21 is in the cutoff state, the collector circuit of bypass transistor 31 receives little current from control electrode 22 so that the collector circuit is operated with the characteristic shown by a point 40, to thereby ground the control electrode 22 at the analog signal frequency. The resistance exhibited by the collector circuit in this state is between several ohms and several tens of ohms. The emitter current of the transistor is selected in consideration of the signal current which flows through the silicon controlled rectifier 21 when the latter is placed in the conductive state. For a signal current of about 10mA, the collector constant current may be between 0.5mA and 1mA.

Referring back to FIG. 1, the switching circuit 10 is accompanied by a rectified power source 41 connected to terminal 12 through a resistor 44 to apply a forward bias to the silicon controlled rectifier 21 so as to apply a positive electric potential to the collectors of transistors 31 and 36. The potential of power source 41 connected to the anode of rectifier 21, for which 2V is sufficient, may be 5 through 6V in view of the internal resistance of the power source 41. The silicon controlled rectifier 21 once turned on is turned off by momentarily disconnecting the rectifier power source 41 from the anode of rectifier 21.

The switching circuit 10 is further accompanied by a pair of current-limiting and potential-dividing resistors 43 and 44 and a pair of bypass capacitors 47 which provide a low impedance at the signal frequency. By means of resistors 43 and 44, the current which flows through the rectifier 21, when in the turned on or conductive state, and the potential at control electrode 22 of the conductive rectifier 21 may be set at 10mA and 2.5V, respectively. The value of the current should be determined so as not to cause a deterioration of the signal superimposed on the current flowing through the conductive rectifier 21.

The potential at first terminal 37 of the control circuit 15 is selected to provide a suitable bias to the collector circuit of actuating transistor 36 over the potential supplied to the collector of that transistor from control electrode 22. The potential at the second terminal 38 of control circuit 15 is determined to provide, when the potentials of the first and the second terminals 37 and 38 are interchanged, a desired amount of actuating or striking current to silicon controlled rectifier 21 above the value of the current which flows to ground through bypass transistor 31. The total actuating current may be 1 through 2mA for a rated current of about 10mA of rectifier 21.

It has been confirmed that the crosstalk attenuation of −70dB attained with a conventional switching circuit of the type having no bypass circuit is improved to −100dB by use of the switching circuit of the invention having the circuit elements exemplified above and with the collector constant current being set at 1mA.

While the invention has thus far been described as utilizing a silicon controlled rectifier as the semiconductor controlled switching element, other elements such as a bidirectional thyristor or a solid-state four-layer semiconductor thyristor may be employed as this element.

When the switching circuit 10 comprises a bidirectional thyristor in place of silicon controlled rectifier 21, the bypass and the actuating transistors 31 and 36 should be PNP and NPN transistors, respectively, because the sense of the control electrode current of the former is reversed to that of the latter.

Referring to FIG. 3, a switching matrix according to this invention comprises a plurality (here four) of row conductors 51, 52, 53, 54, a plurality (here three) of column conductors 61, 62, 63, and switching circuits 5161, 5162, 5261, 5262, 5463, corresponding to the switching circuit 10 illustrated with reference to FIG. 1 and interposed between the row and the column conductors 51 at the respective crossovers. The switching element in each of the switching circuits is connected between one of the row conductors and one of the column conductors. Thus, for example, the cathode-anode circuit of the rectifier in switching circuit 5463 is connected between row conductor 54 and column conductor 63. The controllable semiconductor elements should preferably be of the similar type and connected between the row and column conductors in the same polarity. The switching circuits are accompanied by a row and a column selection circuit 70R and 70C which in combination correspond to the control circuit 15 described in greater detail below with reference to FIG. 4.

In the embodiment depicted in FIG. 3, the bases of the actuating transistors in the switching circuits arranged along each of the column conductors 61, 62, 63 are respectively connected together and to the corresponding one of first terminals $37_1$, $37_2$, $37_3$ of column selection circuit 70C. Similarly, the emitters of these actuating transistors are respectively connected together to the corresponding one of second terminals $38_1$, $38_2$, $38_3$, $38_4$ of row selection circuit 70R through the respective resistors. Alternatively, it is possible to connect the bases of the actuating transistors aligned with each row conductor together to the corresponding one of the terminals of the row selection circuit 70R and to connect the emitters of these transistors aligned with each column conductor together through the respective resistors to the corresponding one of the terminals of the column selection circuit 70C. In the latter case, the terminals of row and column selection circuits 70R and 70C correspond to the first and the second terminals 37 and 38 of the control circuit 15, respectively.

The switching circuits 5161, 5162, 5463, are further accompanied by NAND gates 71, 72, 73, and control terminals 81, 82, 83, respectively connected to the inputs of these gates. The NAND gates and the control terminals therefor are preferably connected to the row or the column conductors to which the anodes of the controllable semiconductor switching elements are connected. It is to be understood that NAND gates 71, 72, 73, are accompanied by a common power source (not shown) as is known in the art. Each NAND gate may preferably be a buffer NAND circuit and may comprise an MPB205C integrated circuit manufactured by the Nippon Electric Company for providing an electric current of about 10mA at 3 through 6V. With the NAND gates 71, 72, 73 it is possible to turn off the once turned on controllable semiconductor switching element by supplying a logical 1 signal to the corresponding one of the control terminals 81, 82, 83, to thereby reduce the potential at the output terminal of the NAND circuit which has supplied the current to turn off the switching element to approximately 0V. The NAND gates may be replaced with other logical circuits, such as AND or OR gates, if it is possible therewith to provide sufficient current for the switching circuits and the logical product or sum with the logical control signals for supplying and removing the forward bias to and from the switching circuits. In addition, it should be appreciated that the bases of the bypass transistors are connected to a common power source (not shown), that the emitters thereof are connected to a common constant voltage source (not shown) through the respective resistors as in the switching circuit of FIG. 1, and that a common capacitor may be substituted for the capacitors interposed between the ground and the individual ones of the row or the column conductors to which the NAND gates 71, 72, 73 are not connected.

Referring further to FIG. 3, it is assumed that the switching matrix comprises the circuit elements exemplified above, that the first terminals $37_1$, $37_2$, $37_3$, and the second terminals $38_1$, $38_2$, $38_3$, usually provide 10V and 7V, respectively, and that it is desired to bring the switching circuit 5463 into the conductive state to establish the connection between the row and the column conductors 54 and 63. Now, the potentials at the related first and second terminals $37_3$ and $38_4$ are interchanged. If it is further desired to put the switching circuit 5261 into the conductive state to establish the connection between row and column conductors 52 and 61, the potentials at the corresponding first and second terminals $37_1$ and $38_2$ are interchanged. Under the circumstances, it is wasteful to cause the current flow for each of the bypass transistors of those switching circuits arranged along the remaining row or column conductors, such as 51, 53, or 62, which are not involved in carrying information.

The wasted power is reduced by changing the base voltage of the actuating transistors to a value that renders these transistors conductive in the switching circuits 5162, 5262, arranged along the column conductors 62 and which are not connected with any row conductors 51, 52, 53, 54, and by changing the base voltage of the bypass transistors to a value that puts such transistors into the nonconductive state in the same switching circuits. The bypass action of the bypass circuit means is thereby switched over to the actuating circuit means having the actuated transistors whose base voltage is lowered to make them conductive.

It is to be recalled that the bases of the actuating transistors are connected together along each row or column conductor. When the bases are connected together along each of the column conductors 61, 62, 63, as shown in FIG. 3, the switching circuits in which the actuating circuit means takes over the bypass action are those arranged along the column conductors which are connected to none of the row conductors 51, 52, 53, 54, therethrough. In this instance, it will be understood that the bases of the bypass transistors arranged along each of the column conductors 61, 62, 63, should be connected to a voltage-adjustable common power source for the individual column conductors. The base voltage of the bypass transistors may, for example, be usually −1V, and the potential at the output terminal of the NAND gates 71, 72, 73, is usually 5V. The potential at the cathode of the silicon controlled rectifiers rises to 2–4V when the rectifier is conductive. Under these circumstances, the base voltages of the bypass and the actuating transistors in the switching circuits arranged along those column conductors 62, which are not connected to any of the row conductors 51, 52, 53, 54, through the silicon controlled rectifiers, should be lowered to, for example, −5V and −2V, respectively.

Referring to FIG. 4, a control circuit suitable for use in supplying the base voltage to the actuating transistor 36, shown in FIG. 1, or to the actuating transistor in the switching circuits of the switching matrix, shown in FIG. 3, comprises an output terminal 37 which corresponds to the first terminal 37 illustrated in FIG. 1, or any one of the first terminals $37_1$, $37_2$, $37_3$, shown in FIG. 3. The control circuit further comprises a first input terminal 91 supplied with a first control signal that can assume either of the values of logical 1 or 0, and a second input terminal 92 supplied with a second control signal similarly capable of assuming the value of logical 1 or 0. A first gate circuit 93 is connected to input terminal 91 for producing an output signal of 12V and −2V when the first control signal is logical 1 and 0 respectively, and a second gate circuit 94 is connected to input terminal 92 for producing an output signal of 10V and 7V when the second control signal is logical 1 and 0 respectively. A resistor 95 is connected between the output terminal of gate circuits 93 and output terminal 37, and a clamping diode 96 has an anode and cathode respectively connected to output terminal 37 and to the output terminal of gate circuit 94. When the first and the second control signals are both logical 1, the potential which appears at the output terminal 37 is 10V as clamped by the clamping diode 96. When the first and the second control signals are logical 1 and 0 respectively, the potential at output terminal is 7V, being clamped by the clamping diode 96. When the first control signal assumes the value of logical 0, the potential at terminal 37 assumes −2V, irrespective of the logical value of the second control signal. Preferably, the circuit still further comprises a third input terminal 97 which is held at a potential of −2V and connected to output terminal 37 through a resistor 100, a fourth input terminal 98 held at a potential higher than −2V, and a second clamping diode 99 whose anode and cathode are connected to the fourth input terminal 98 and the output terminal 37, respectively. When the first control signal is logical 0, this additional circuit serves to clamp the potential at output terminal 37 at −2V. The logical values of the first and the second control signals may be specified by a memory circuit (not shown), such as a flip-flop circuit.

With the circuits described in conjunction with FIG. 4 connected to the respective first and second terminals $37_1$, $37_2$, $38_1$, $38_2$, the base and the emitter voltages are usually held at −2V. When it is desired to extend the signal path from a row conductor 54 to a column conductor 63, the potentials at the related first and second terminals $37_3$ and $38_4$ are changed to 7V and 10V, respectively. It is possible to detect completion of the signal path in the manner known in the switching system technology, whereby the potentials at terminals $37_3$ and $38_4$ are changed to 10V and 7V, respectively. At this moment, the base voltage of the bypass transistors arranged along the other column conductors, such as 61 and 62, is changed from the usual value of −5V to −1V.

The switching circuit of the invention herein described has the capability of selectively establishing conduction of an input analog signal between an input and output terminal in response to a control signal in a manner which significantly decreases the amount of signal leakage and crosstalk, and significantly increases the signal-to-noise ratio of the circuit as compared to the heretofore known switching circuits of this type.

While the invention has been herein specifically described with respect to several preferred embodiments thereof, it will be apparent that modification may be made therein all without departing from the spirit and scope of the invention.

What is claimed is:

1. A switching circuit for selectively coupling an input signal between an input and an output terminal comprising a semiconductor switching element having a normally non-conducting circuit path between said input and output terminals and a control electrode effective when a control signal exceeding a predetermined value is applied thereto to effect conduction through said circuit path, a bypass circuit coupled to said switching element for grounding said control electrode with respect to the frequency of the input signal, said bypass circuit serving as a constant-current source for said switching element when the electric potential at said control electrode is higher than said predetermined value, the value of said constant current being smaller than the current which flows through said switching element when said element is conductive.

2. The switching circuit of claim 1, in which said predetermined value is lower than the electric potential which said control electrode assumes when said switching element is conductive.

3. The switching circuit of claim 2, wherein said bypass circuit comprises a transistor having a first electrode connected to said control electrode and a second electrode grounded with respect to the signal frequency, said transistor exhibiting a constant-current characteristic between said first and second electrodes when the potential of said first electrode is higher than the potential at said control electrode when said switching element is conductive.

4. The switching circuit of claim 3, further comprising an actuating circuit having two input terminals for receiving first and second input signals, respectively, and an output terminal for supplying an output signal to said control electrode, said output signal assuming a value for rendering said switching element conductive when said first and second input signals assume respective predetermined values, said output signal being larger than the loss caused thereto by said bypass circuit.

5. The switching circuit of claim 4, further comprising a control circuit coupled to said actuating circuit for interchanging the values of said first and second input signals to provide said input signals at said respective predetermined values.

6. The switching circuit of claim 5, wherein said actuating circuit comprises a transistor having base, emitter, and collector electrodes, said base electrode and one of said emitter and said collector electrodes serving as said two input terminals, and the other of said emitter and said collector electrodes serving as said output terminal.

7. The switching circuit of claim 1, further comprising an actuating circuit having two input terminals for receiving first and second input signals, respectively, and an output terminal for supplying an output signal to said control electrode, said output signal assuming a value for rendering said switching element conductive when said first and second input electric signals assume respective predetermined values, said output signal being larger than the loss caused thereto by said bypass circuit.

8. The switching circuit of claim 7, further comprising a control circuit coupled to said actuating circuit for interchanging the values of said first and second input signals to provide said input signals at said respective predetermined values.

9. The switching circuit of claim 8, wherein said actuating circuit comprises a transistor having base, emitter, and collector electrodes, said base electrode and one of said emitter and said collector electrodes serving as said two input terminals, and the other of said emitter and said collector electrodes serving as said output terminal.

10. A switching matrix including a plurality of intersecting row and column conductors and comprising a plurality of controllable semiconductor switching elements respectively arranged at each of the crossovers of said row and said column conductors for establishing and breaking the connection for analog signals between the row conductor and the column conductor crossing at each of said crossovers, a plurality of bypass circuits coupled respectively to the control electrodes of said plurality of switching elements for grounding the respective control electrodes of said switching elements with respect to the frequency of the analog signal, said bypass circuits each serving as a constant-current source when current is caused to flow through the associated ones of said controllable semiconductor switching elements.

11. The switching matrix of claim 10, wherein each of said bypass circuits serves as a constant-current circuit when the potential of the control electrode grounded thereby at the analog signal frequency is higher than a predetermined value, the constant current being of a magnitude less than the current which flows through the one of said switching elements respectively coupled to said bypass circuit when the former is conductive.

12. The switching matrix of claim 11, further comprising a plurality of actuating circuits respectively coupled to said switching elements, said actuating circuits each having two input terminals for receiving two input signals, respectively, and an output terminal for supplying an output signal to the control electrode of the associated one of said switching elements, said output signal assuming a value for rendering the last-mentioned switching element conductive when the two input signals assume respective predetermined values, said output signal being larger than the loss caused thereto by said bypass circuit grounding the last-mentioned control electrode, the corresponding ones of said input terminals of said actuating circuit arranged along each of said row conductors being connected together, the other corresponding ones of said input terminals of said actuating circuit arranged along each of said column conductors being connected together.

13. A switching matrix including a plurality of intersecting first and second conductors, said matrix comprising a plurality of controllable semiconductor switching elements arranged at each of the crossovers of said plurality of first and second conductors for establishing and breaking the connection for an analog signal between the first conductor and the second conductor crossing at each of said crossovers, a plurality of bypass circuits for grounding the respective control electrodes of said switching elements with respect to the frequency of the analog signal, said bypass circuits each serving as a constant-current circuit when the electric potential of the control electrode grounded thereby is higher than a predetermined value, the constant current being smaller than the current which flows through the one of said switching elements served by the one of said bypass circuits when the last-mentioned of said switching elements is conductive, a plurality of actuating transistors each having base, emitter, and collector electrodes, one of said emitter and said collector electrodes being respectively connected to the control electrode of each of said switching elements, the base electrodes of said actuating transistors arranged along each of said first conductors being connected together, the others of said emitter and said collector electrodes of said actuating transistors arranged along each of said second conductors being connected together, bias means for supplying a forward bias across said predetermined one electrode and said base electrode of each of said actuating transistors arranged along each of said first conductors which are not connected to any of said second conductors by the associated ones of said switching elements, and means for rendering non-conductive said bypass circuit for the elements arranged along the last-mentioned ones of said first conductors.

* * * * *

UNITED STATES PATENT OFFICE
CERTIFICATE OF CORRECTION

Patent No. 3,694,812 Dated September 26, 1972

Inventor(s) Osamu Enomoto

It is certified that error appears in the above-identified patent and that said Letters Patent are hereby corrected as shown below:

IN THE CAPTION:

The Foreign Application Priority Data should have been indicated as follows:

--Foreign Application Priority Data

August 25, 1970 Japan....................45/74769
December 29, 1970 Japan....................45/121089--

Signed and sealed this 13th day of February 1973.

(SEAL)
Attest:

EDWARD M.FLETCHER,JR.
Attesting Officer

ROBERT GOTTSCHALK
Commissioner of Patents